Patented Oct. 11, 1938

2,132,711

UNITED STATES PATENT OFFICE 2,132,711

MOISTUREPROOF COMPOSITION AND PREPARATION THEREOF

Vanderveer Voorhees, Hammond, Ind., assignor to Standard Oil Company, Chicago, Ill., a corporation of Indiana No Drawing. Application May 25, 1936, Serial No. 81,644

3 Claims. (Cl. 154—46)

This invention relates to improvements in moisture-proof materials and the like, and in particular, to improvements in moisture-proof regenerated cellulose and the like and the preparation thereof.

The use of non-fibrous, smooth surface, transparent sheets such as sheets of regenerated cellulose—popularly known as Cellophane—has to a large extent replaced paper and the like for wrapping and packaging purposes. The widespread use of such materials has been, in a large measure, due to their transparent and moisture-proof properties. Heretofore, materials of the aforementioned type have been made moisture-proof by coating the same externally with various types of moisture-proofing substances. There are several undesirable properties inherent in the heretofore methods of, and compositions for, moisture-proofing materials of the aforementioned type. Among these may be mentioned the tendency of the moisture-proofing composition to affect the transparency of the base material and the tendency of such moisture-proofing compositions to age and to become brittle and crack at low temperatures. Furthermore, the moisture-proofing coating is easily removed from the base material by handling.

It is, therefore, an object of this invention to provide an improved method of moisture-proofing non-fibrous, smooth surface sheets, such as sheets of regenerated cellulose—popularly known as Cellophane.

Another object of this invention is to provide an improved method of moisture-proofing non-fibrous, smooth surface sheets of the aforementioned type without coating the external surfaces with a moisture-proofing composition.

Another object of this invention is to provide moisture-proof non-fibrous, smooth surface sheets of the aforementioned types which are transparent.

Another object of this invention is to provide improved moisture-proof, non-fibrous, smooth surface sheets of the aforementioned types which are odorless.

Still another object of this invention is to provide improved moisture-proof, non-fibrous, smooth surface sheets of the aforementioned types which remain flexible and pliable at extremely low temperatures. Another object is to provide a laminated regenerated cellulose product having as a bonding agent a material which is permanently plastic at all temperatures and allows relative movement of the sheets whereby curling of the sheets is substantially eliminated.

Other objects will become apparent from the following description and the appended claims.

I have found that the above objects can be obtained by fabricating lamellar sheets of regenerated cellulose and the like using as a cement or a binder between each lamella a new type of synthetic, viscous, plastic, high-molecular weight hydrocarbon resin. I refer to resins of this type as "viscoresin." These "viscoresins" are permanently plastic at all temperatures and are therefore called isoplastic resins.

These viscoresins, produced by the polymerization of certain olefinic hydrocarbons under appropriate conditions, are viscous, plastic materials usually of an extremely "tacky" or sticky nature having high average molecular weights ranging from 1000 to 50,000 and preferably from 1500 to 15,000. They are essentially saturated hydrocarbons in their chemical composition and reactions although their empirical formula is approximately $C_nH_{2n}$.

The viscoresins can be produced in various ways from various materials by polymerization, and/or condensation, and although they may differ somewhat depending on the method of manufacture, they possess generally similar properties.

The preferred viscoresin is made by the polymerization of isobutylene with aluminum chloride, or preferably, boron trifluoride although other hydrolyzable metal halide catalysts may be used. In making this resin it is desirable to carry out the polymerization at a low temperature, for instance below 0° F. and preferably from −40° F. to −100° F. or even lower. The polymerization reaction may be carried out in the presence of a solvent such as naphtha, hexane, pentane, butane or propane, which acts as an inert diluent and facilitates handling the viscous product and cooling the reaction.

As an example of one preferred method, isobutylene is treated in the presence of an equal volume of butane at a temperature of −80° F., with about 0.1% to 0.5% by weight of boron trifluoride. Thus, the isobutylene which is liquid at −40° F. can be held in a vessel surrounded by a refrigerating bath and boron trifluoride gas can be led in with constant stirring until the desired plastic, viscous resin is produced. The reaction under these conditions is complete within a few minutes and produces a viscoresin having a degree of plasticity which is usually highly desirable in connection with my invention. The reaction product may be obtained by warming to remove butane and unreacted boron fluoride, neutralized and washed with water.

The hardness of the viscoresin produced can be controlled to a considerable extent by the proper selection of the starting materials, catalysts, reaction temperature, etc. Thus, in the case of the viscoresins produced from isobutylene by the use of a boron trifluoride catalyst as above described, it is a general rule that the lower the reaction temperature the harder are the viscoresins produced. Also under given reaction conditions pure isobutylene gives a harder viscoresin than does a mixture of petroleum refinery gases which contains isobutylene. It is also possible by the use of solvents, such as liquefied normally gaseous hydrocarbons such as butane and propane, acetone-alcohols, acetone-benzol or by vacuum distillation and/or other processes to fractionate viscoresins into relatively hard fractions and relatively soft fractions in order to produce viscoresins having the desired properties.

In some cases it will be found that a small amount of synthetic oil is produced in the polymerization reaction. A substantial amount of oil is detrimental to the use of these viscoresins as moisture-proofing compositions. This oil may be removed from the viscoresin by extraction with solvents such as propane, acetone-alcohol or acetone-benzol and/or by vacuum distillation, etc. However, in most cases satisfactory compositions can be made without fractionating the viscoresin and without removing any small amount of synthetic oil produced with it.

If the viscoresin produced is not of satisfactory color and odor, it can be rendered so, if desired, by treatment in light hydrocarbon solution, or otherwise, with sulfuric acid, with fuller's earth or other treating agents as in the manufacture of refined petroleum oils.

This invention contemplates the fabrication of moisture-proof sheets of regenerated cellulose and the like by cementing or bonding together two or more sheets of such materials with viscoresins of the aforementioned types. This may be suitably done by applying a thin coating of viscoresin to one surface of the regenerated cellulose sheet by means of spraying, brushing or passing the sheets over rollers rotating in a bath of a viscoresin and subsequently pressing a second sheet of regenerated cellulose thereto. The latter step may be suitably done by passing the sheets through a series of rollers having the proper clearances. When viscoresins of high molecular weight are used I prefer to reduce the viscosity thereof before applying, by diluting the same with a suitable hydrocarbon solvent or thinner such as benzol, light naphtha, hexane, carbon tetrachloride and the like. Viscoresins of lower molecular weight may be used with or without a solvent. I may impart characteristic coloring to the lamellar sheets by dyeing the viscoresin with suitable soluble dyes.

The use of the isoplastic resin which is permanently plastic at all temperatures as a binder for the unshrunken sheets of regenerated cellulose and the like permits relative movement of the sheets and so eliminates substantially any tendency of the sheets to curl, buckle, etc.

The lamellar sheets of regenerated cellulose and the like prepared in the foregoing manner are made moisture-proof by the viscoresin film to which they are bonded. Regenerated cellulose sheets moisture-proofed in this manner are superior to those moisture-proofed in the manner taught by the prior art in that there is no danger of removing the moisture-proofing composition, since the same is not touched when the sheets are being handled. Furthermore, lamellar sheets of regenerated cellulose and the like treated in the foregoing manner are as transparent as the single sheets of regenerated cellulose due to the clear colorless property of the viscoresin binder. Because of this advantageous property printed matter may be put on one of the cemented surfaces without impairing the clearness thereof. Printed matter so applied cannot be rubbed off. Moreover, sheets of regenerated cellulose and the like treated as above described remain more flexible and pliable than prior art materials at extremely low temperatures.

The moisture-proof sheet prepared in the foregoing manner is suitably adapted for wrapping and packaging articles from which the loss of moisture is detrimental. Articles of foodstuffs, vegetables, candies and tobacco goods remain fresh for longer periods because the moisture content thereof remains substantially the same even during long storage, because of the moisture-proof bond between the lamellae of the sheet.

It is to be understood that I do not limit the scope of this invention to the foregoing specific description but to the appended claims which are to be construed as broadly as the prior art will permit.

I claim:

1. A moisture-proof, non-fibrous transparent lamellar sheet which remains flexible at low temperatures consisting of a plurality of lamellae of regenerated cellulose bonded to and enclosing an unbroken film of a hydrocarbon consisting essentially of a product of the low temperature polymerization of isobutylene having a molecular weight of 1500 to 15000 between said lamellae.

2. A moisture-proof transparent non-curling lamellar sheet which remains flexible at low temperatures consisting of a plurality of unshrunken films of regenerated cellulose and between said films, and bonded thereto, an unbroken layer consisting essentially of a high molecular weight isoplastic resin obtained by the low temperature polymerization of isobutylene.

3. A flexible, transparent, moisture-proof laminated sheet material suitable for wrapping foodstuffs, consisting essentially of an unbroken film of a sticky, plastic, transparent, hydrocarbon polymer of isobutylene bonded to and enclosed within two sheets of non-fibrous regenerated cellulose of low moisture resistance, the transparency of said cellulose sheets being unimpaired by the said hydrocarbon polymer which is of sufficient thickness to render the combination substantially impervious to moisture.

VANDERVEER VOORHEES.